(12) United States Patent
McVaugh

(10) Patent No.: US 7,494,087 B2
(45) Date of Patent: Feb. 24, 2009

(54) REEL HANDLER

(75) Inventor: Arthur K. McVaugh, Green Lane, PA (US)

(73) Assignee: Dejana Truck & Utility Equipment Co., Inc., Kings Park, NY (US)

( * ) Notice: Subject to any disclaimer, the term of this patent is extended or adjusted under 35 U.S.C. 154(b) by 148 days.

(21) Appl. No.: 11/606,256

(22) Filed: Nov. 29, 2006

(65) Prior Publication Data

US 2008/0121749 A1     May 29, 2008

(51) Int. Cl.
*B65H 16/02*     (2006.01)
(52) U.S. Cl. .................... 242/557; 242/399.1; 242/403; 242/578; 414/911
(58) Field of Classification Search .............. 242/399.1, 242/559.4, 403, 390.7, 557, 578; 414/546, 414/555, 911
See application file for complete search history.

(56) References Cited

U.S. PATENT DOCUMENTS

| 4,084,763 A | * | 4/1978 | Zamboni ..................... 242/393 |
| 4,091,946 A | * | 5/1978 | Kraeft et al. ................. 414/501 |
| 4,594,041 A | * | 6/1986 | Hostetler .................... 414/24.5 |
| 5,662,449 A | * | 9/1997 | Krinhop ..................... 414/24.5 |
| 5,839,514 A | * | 11/1998 | Gipson ........................ 166/384 |
| 5,895,197 A | * | 4/1999 | McVaugh ................... 414/680 |
| 5,897,073 A | * | 4/1999 | McVaugh ................ 242/399.1 |
| 5,988,555 A | * | 11/1999 | Unruh et al. ................. 242/470 |
| 6,543,713 B1 | * | 4/2003 | Frolander et al. ........ 242/399.1 |

\* cited by examiner

*Primary Examiner*—Sang Kim
(74) *Attorney, Agent, or Firm*—Kinney & Lange, PA

(57) ABSTRACT

A cable reel handler device, including a slide base on a vehicle having channels aligned transverse to the length of the vehicle. A pair of movable carriages provide lateral movement in the channels via hydraulic cylinders. Lifting arms mounted respectively on the carriages extend out to engage a reel, and have an extensible torsion bar shaft to maintain a fixed alignment. Hydraulic lift cylinders move the lifting arms in unison to move a reel to and from the vehicle and in position for winding and unwinding cable on the reel. Hydraulic motors rotate the reel for winding and unwinding cable. A source of hydraulic fluid is operably connected to all the hydraulic devices.

20 Claims, 2 Drawing Sheets

REEL HANDLER

FIELD OF THE INVENTION

The present invention relates to a reel handler device having at least one reel arm for engaging reels of various sizes to load and unload the reels from trucks or trailers. More particularly, the present invention relates to a reel handler device with increased range of movement.

BACKGROUND OF THE INVENTION

Reel handlers for loading and unloading reels from trucks or trailers are not new per se. Some reel handlers allow for powered payout and take-up of cable from the loaded reels by the use of friction rollers contacting the periphery of the reels. Examples are Hall, U.S. Pat. Nos. 3,184,082 and 3,325,118; and Woodruff, U.S. Pat. No. 4,228,967. Skalleberg et al U.S. Pat. No. 5,123,602 discloses a drive for cable reels by the use of frictional contact of the reel periphery with a powered car tire as the roller. However these methods of reel rotation are not precise and braking of the reel by friction contact of the rollers/tires against the reel is less than optimal. Further, powered rotation, and prompt reversal of the rotation, is limited by slippage of the roller at the reel periphery.

McVaugh, U.S. Pat. No. 3,820,673 allows for engagement of reels of varying sizes and permits transfer of one reel to a first location and return for a second reel. An improvement on that patent is McVaugh U.S. Pat. No. 5,897,073, which has the advantage of using rugged motors and devices of relatively few moving parts to minimize damage and breakdown of the reel handler during use.

While that latter reel handler uses a compact, high torque, low speed hydraulic motor within its supporting reel arm to rotate the reel, there are some drawbacks to that design. Specifically, the angular travel or swing of the lift arms was less than preferred, and it was not seen to be possible to increasing the swing because of space constraints. In addition, mechanical losses at either end of the cylinder stroke became a concern. This patent uses mechanical "toggle links" between the lift arms and their lift hydraulic cylinders to achieve the angular swing of the lift arms, but they have a built in mechanical disadvantage.

Another disadvantage of the prior art devices is that lateral movement of the lifting arms is limited by the common physical limitation of all motor vehicles to maintain an overall vehicle width of 96 inches while in transit. In addition, lateral force needs to be applied to the cable as it is being withdrawn to evenly load the reel.

Accordingly, it would be an advantage in the art if a reel handler could be provided with improved angular travel or swing.

Another advantage would be to provide a reel handler that would have increased lateral movement without increasing the transit width of the vehicle.

Yet another advantage would be if a reel handler would be able to move the cable reel laterally to evenly wind the cable on the reel without a lateral force.

Other advantages will appear hereinafter.

SUMMARY OF THE INVENTION

It has now been discovered that the above and other objects of the present invention may be accomplished in the following manner. Specifically, the present invention provides a reel handler device that has increased angular travel or swing and improved lateral movement. In addition, the device of this invention is capable of lifting and moving a cable reel laterally for the full width of the reel, typically 56 inches, while rotationally powering the reel to provide a full level winding of the cable being pulled from underground and wound on to the reel or spool.

The reel handler of this invention is mounted on a truck or other vehicle such that it is at the back of the truck and a portion of the truck includes a place for placing at least one reel having cable of assorted sizes and construction that are common in the electric utility and telephone industries. A slide base is mounted on the vehicle having a plurality of channels aligned transverse to the length of said vehicle. Preferred are four channels forming two pairs of channels for lateral movement of movable carriages on said base using hydraulic double-acting cylinders in the channels. The total distance the movable carriages move is equal to the width of the reel to be used with the device, so that winding or unwinding can be level as cable is added to or removed from the reel. It is preferred that the channels be relatively friction free so that the movable carriages will move laterally in them. Durable plastic liners in the channels reduce the friction of metal on metal. Alternatively, the movable carriages may have a low friction liner for contact with the channel. Both options together are also contemplated as part of this invention.

Lifting arms are mounted respectively on the movable carriages at one end thereof and extend out to a reel engaging position. The lifting arms having a torsion bar shaft, preferably square, attached thereto to maintain a fixed alignment between them. Hydraulic lift cylinders move the lifting arms in unison to thereby move a reel to and from a place on the vehicle and a second position for winding and unwinding cable on said reel, such as over a manhole in a street or road.

Hydraulic motors mounted on the lifting arms rotate the reel mounted on the first and second lifting arms in unison to thereby rotate the reel for winding and unwinding cable on the reel. The hydraulic motors having output stub shafts for engaging the reel and transmitting rotation from the hydraulic motors to the reel. Additional engaging studs may also assist in transferring rotation from the motors to the reel.

The device of this invention preferably will include one or more hydraulic jacks that are lowered to engage the ground when the device is in use, to stabilize the vehicle and prevent movement when the reel is placed furthest from the vehicle. The arc that the reel passes through will be from the bed of the vehicle to the ground, so that a reel can be added to or removed from the vehicle. In the preferred embodiment this arc is approximately 160 degrees of angle. Typically the reels weigh up to 16,000 pounds, depending on the nature of the cable and the material from which the reel is made. Reels have different sizes and a typical reel handler will work with reels of sixty inches up to ninety six inches, more or less.

A source of hydraulic fluid is operably connected to the hydraulic double-acting cylinders in the channels, the hydraulic lift cylinders on the lifting arms, and the hydraulic motors on the reel engaging positions on the lifting arms. Each hydraulic device has its own control system so that the source of hydraulic fluid is selectively used to move the reel side to side or center it for transport, as well as lift or position a reel, and rotate it. The control systems are preferably centralized for convenience.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
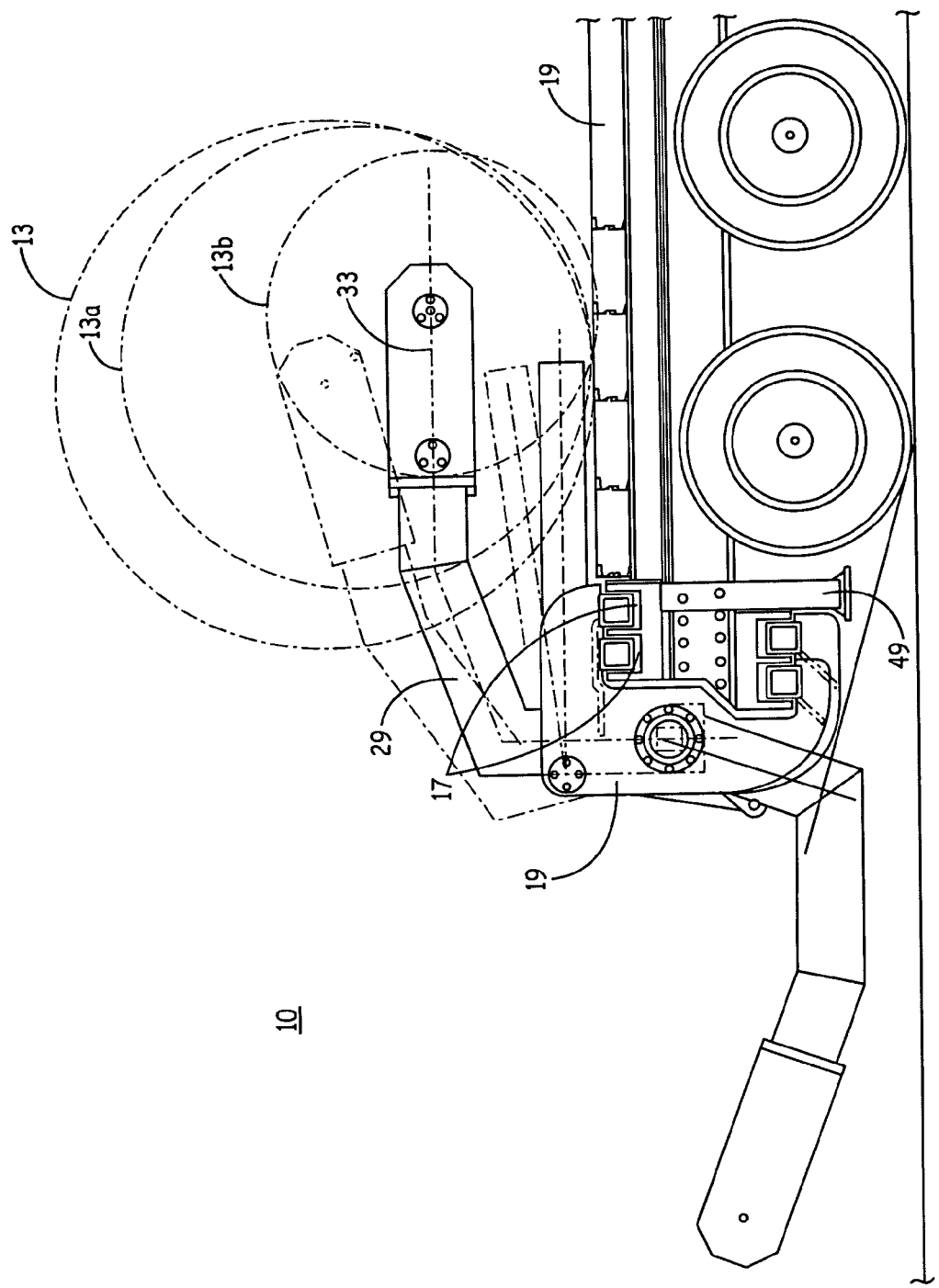
FIG. 1 is a side elevational view of the preferred embodiment of the present invention, shown in two positions.

While particular embodiments of the present invention have been illustrated and described, it is not intended to limit the invention, except as defined by the following claims. In all figures, like reference numerals are for identical parts.

A reel handler device, 10 generally, is adapted to be used with a vehicle such as a flat bed truck 11, preferably with tandem axles as shown in the drawings. The truck 11 is used to transport reels 13 of assorted sizes and construction that are common in the electric utility and telephone industries to carry cable material. Reel handlers are used to remove old cable in some operations and thus operate as a cable puller and they are used to install new cable in various locations such as under streets and the like.

The reel handler device 10 includes a slide base 15 that serves as the foundation of the machine and supports all other components. Slide base 15 is simply an assembly of a plurality of channels 17, preferably four channels or troughs, that are aligned transverse to the length of vehicle 11 and are preferably horizontal in orientation. Mounted on said slide base 15 for movement inside channels 17 is a first movable carriage 19 and a second movable carriage 21, shown separately in FIG. 2. Carriages 19, 21 ride in the slide channels 17. Preferably a low friction material such as plastic is lined in channels 17 or on the part of carriages 19 and 21 that ride in the channels 17.

Lateralling hydraulic double-acting cylinders 23 are mounted to the carriages 19, 21 and operate to push or pull the carriages 19, 21 laterally from side to side, or to the middle for transit. Cylinders 23 may operate as independent pairs, to push or pull either carriage 19 or 21, or they may be co-joined to move carriages 19 and 21 in unison, right or left, in lock step. Each cylinder 23 has a mounting base 25 for hydraulic connection and a ram 27 such that each cylinder ram 27 incorporates a pair of internal isolated fluid passageways which carry independent fluid sources from a central source of hydraulic fluid.

Figure 2:
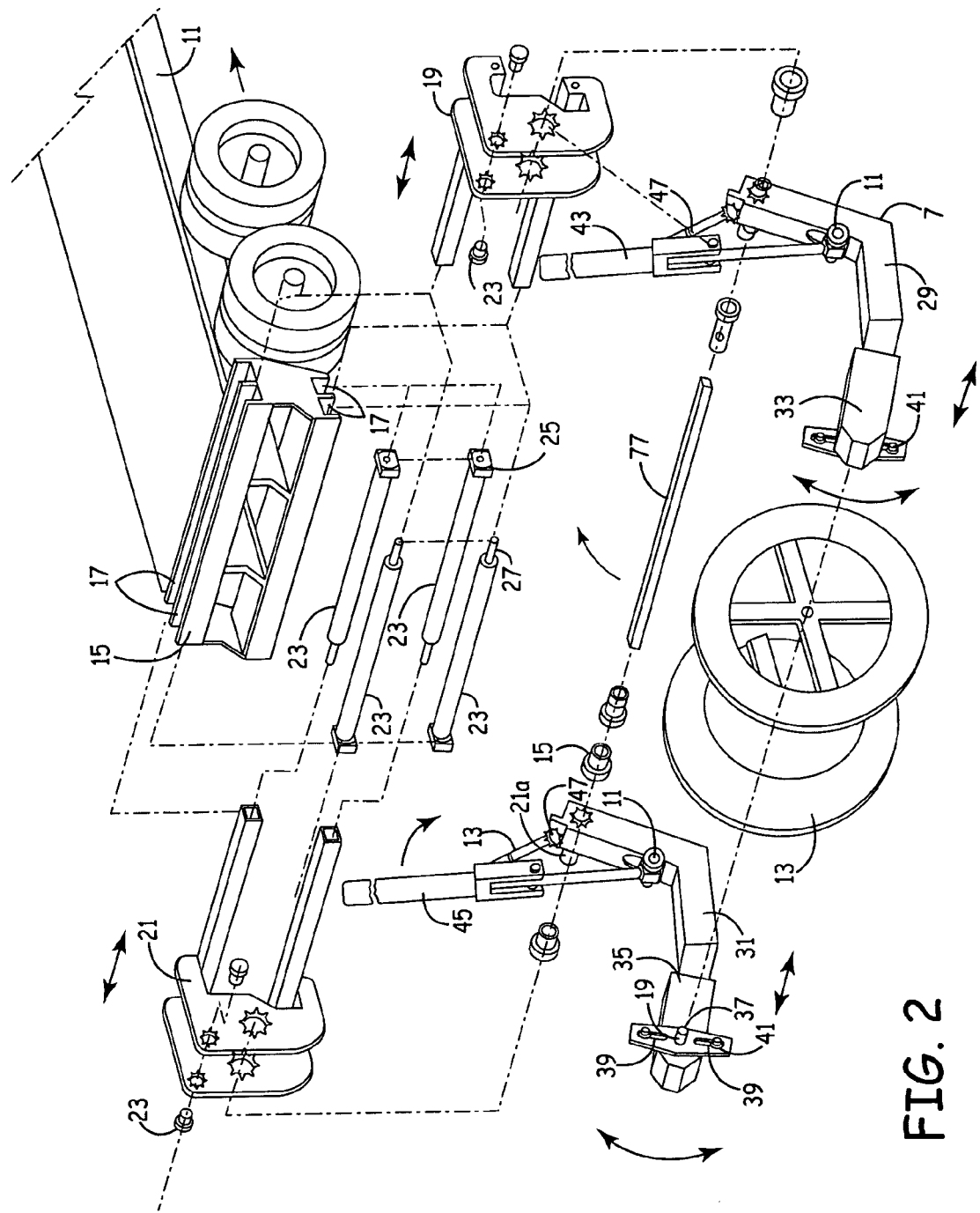
FIG. 2 is an exploded perspective view of the device in FIG. 1.

Each movable carriage 19 and 21 has a lifting arm, 29 and 31 respectively, that raise the reel 13 from the ground and place it on the flat bed body of vehicle 11. The lifting arms 29 and 31 have a torsion bar shaft 77, preferably square, attached thereto to maintain a fixed alignment between them. These arms 29, 31 also move the reel 13 to an elevated position for winding and unwinding cable on the reels being used. Mounted on the outboard ends of lifting arms 29, 31 are hydraulic motors 33 and 35 respectively. Motors 33 and 35 provide a rotating power source for the cable reel. As can be seen in FIG. 2, motors 33, 35 have output stub shafts 37 which engages a conventional cable reel arbor hole, and also may have engaging studs 39 that extend into the spokes of the reel 13 in order to impart a rotational torque to the reel via the driving cross arms 41.

Hydraulic lift cylinders 43 and 45 are mounted in the movable carriages 19 and 21 respectively for raising and lowering them in unison. Also included is a lifting column 47 on each of the lift cylinders 43, 45. All three elements, the lift cylinders 43, 45, the lifting column 47 and the lift arms 29, 31, are all moving simultaneously while maintaining the correct varying angular relationship between power cylinders 43, 45 and the lift arms 29, 31. At about the half way point, when the lifting arm is approximately at a vertical orientation, the lifting column 47 is no longer needed, but, rather, is free to stretch to a greater length and will extend in length telescopically past the point of vertical orientation. In the first half of the stroke of the lifting pistons 43, 45, from the platform to mid point, the rod eye to pivot distance is negative and advancing to zero. At this point the lifting column 47 is needed. In the last half of the stroke of the power pistons 43, 45 the cylinders are self supporting since the rod eye and the barrel pivots are a positive distance apart. In FIG. 1, a conventional hydraulic jack 49 is shown to provide extra stability when heavy reels are being handled.

The advantage of the device of this invention is that it can easily achieve 160° angular swing of the work arm and still have excellent mechanical advantages without using toggles as has been the case in the past.

In operation, the device of this invention engages a reel and lifts it on to the bed of the truck 11. The reel may have electrical or telephone cable or it may be empty, depending on the task to be performed, of either installing cable from the reel or removing cable at a location. The truck then is driven to the intended location and parks near the manhole or other place where cable is to be installed or removed. The lifting arms 29, 31 then lift the reel 13 to suspend the reel 13 over the location using hydraulic lift cylinders 43, 45 and lifting arm 47. Motors 33, 35 then turn reel 13 to take cable off the reel 13 at a speed that is controlled by the circumstances of use. Alternatively, cable is pulled on to reel 13 by motors 33, 35 if that is the task. In both cases, hydraulic double-acting cylinders 23 move, separately or together, to move the carriages 19, 21 from one side to the other, facilitating an even unwinding or winding of the cable without any side force. The cable travels in a straight, linear direction as it is wound or unwound. When the task is completed, the reel is again lifted to rest on the bed of the truck.

While particular embodiments of the present invention have been illustrated and described, it is not intended to limit the invention, except as defined by the following claims.

The invention claimed is:

1. A cable reel handler device for use with a vehicle having a platform for holding a reel, comprising:

a slide base for mounting on said vehicle, said slide base having a plurality of channels aligned transverse to the length of said vehicle;

a first movable carriage for lateral movement in half of said plurality of channels and a second movable carriage for lateral movement in the remaining half of said plurality of channels;

a hydraulic double-acting cylinder in each of said plurality of channels for moving the first and second movable carriages back and forth in said transverse channels;

first and second lifting arms for moving said reel, said first and second lifting arms being mounted respectively on said first and second movable carriages at one end thereof and extending out to a reel engaging position, said lifting arms having an extensible torsion bar shaft attached thereto to maintain a fixed alignment there between;

first and second hydraulic lift cylinders for moving said first and second lifting arms respectively and in unison to thereby move said reel to and from said platform on said vehicle and a position for winding and unwinding cable on said reel;

first and second hydraulic motors mounted at said reel engaging positions on said lifting arms for rotating said reel mounted on said first and second lifting arms respectively and operable in unison to thereby rotate said reel for winding and unwinding cable on said reel, each of said hydraulic motors having output stub shafts for engaging said reel and transmitting rotation from said hydraulic motors to said reel; and a source of hydraulic fluid operably connected to said hydraulic double-acting cylinders in said channels, said hydraulic lift cylinders on said lifting arms, and said hydraulic motors on said reel engaging positions on said lifting arms.

2. The device of claim 1, wherein said plurality of channels is four channels and said first movable carriage moves in two channels and said second movable carriage moves in the remaining two channels.

3. The device of claim 1, wherein a friction reducing material is positioned between the inside of said channels and said first and second movable carriages.

4. The device of claim 1, which further includes at least one hydraulic jack to stabilize said vehicle during operation of said device, said at least one hydraulic jack being operably connected to said source of hydraulic fluid.

5. The device of claim 1, wherein said output stub shafts on said hydraulic motors further include engaging studs for engagement with the spokes of said reel.

6. The device of claim 1, wherein said hydraulic double-acting cylinders operate independently to individually move at least one of said first and second movable carriages laterally.

7. The device of claim 1, wherein said hydraulic double-acting cylinders operate cooperatively to move said movable carriages in unison.

8. The device of claim 1, which further includes a pair of lift columns each mounted at one end of one of said lifting arms and each mounted at its other end to the lift cylinder associated with each lifting arm.

9. The device of claim 8, wherein each of said pair of lift columns are rigid for compression during movement of said lifting arms from said platform to a point at approximately a vertical orientation of said lifting arms and are further adapted to extend in length telescopically past said point of vertical orientation.

10. The device of claim 1, wherein said source of hydraulic fluid includes separate and independent bi-directional hydraulic fluid flow for movement of said hydraulic double-acting cylinders in said channels, said hydraulic lift cylinders on said lifting arms, and said hydraulic motors on said reel engaging positions on said lifting arms.

11. A cable reel handler device for use with a vehicle having a platform for holding a reel, comprising:

a slide base for mounting on said vehicle, said slide base means having a plurality of channels aligned transverse to the length of said vehicle;

first movable carriage means for lateral movement in half of said plurality of channels and second movable carriage means for lateral movement in the remaining half of said plurality of channels;

hydraulic double-acting cylinder means in each of said plurality of channels for moving the first and second movable carriage means back and forth in said transverse channels;

first and second lifting arm means for moving a reel, said first and second lifting arm means being mounted respectively on said first and second movable carriage means at one end thereof and extending out to a reel engaging position, said lifting arm means having an extensible torsion bar shaft means attached thereto for maintaining a fixed alignment there between;

first and second hydraulic lift cylinder means for moving said first and second lifting arm means respectively and in unison to thereby move a reel to and from said platform on said vehicle and a position for winding and unwinding cable on said reel;

first and second hydraulic motor means mounted at said reel engaging positions on said lifting arm means for rotating said reel mounted on said first and second lifting arm means respectively and operable in unison to thereby rotate said reel for winding and unwinding cable on said reel, each of said hydraulic motor means having output stub shaft means for engaging said reel and transmitting rotation from said hydraulic motors to said reel; and hydraulic fluid source means for operably moving said hydraulic double-acting cylinder means in said channels, said hydraulic lift cylinder means on said lifting arm means, and said hydraulic motor means on said reel engaging positions on said lifting arm means.

12. The device of claim 11, wherein said plurality of channels is four channels and said first movable carriage means moves in two channels and said second movable carriage means moves in the remaining two channels.

13. The device of claim 11, wherein a friction reducing material is positioned between the inside of said channels and said first and second movable carriage means.

14. The device of claim 11, which further includes at least one hydraulic jack means for stabilizing said vehicle during operation of said device, said at least one hydraulic jack means being operably connected to said hydraulic fluid source means.

15. The device of claim 11, wherein said output stub shaft means on said hydraulic motor means further include engaging studs for engagement with the spokes of said reel.

16. The device of claim 11, wherein said hydraulic double-acting cylinder means operate independently to individually move at least one of said first and second movable carriage means laterally.

17. The device of claim 11, wherein said hydraulic double-acting cylinder means operate cooperatively to move said movable carriage means laterally in unison.

18. The device of claim 11, which further includes a pair of lift columns each mounted at one end of one of said lifting arm means and each mounted at its other end to the lift cylinder means associated with each lifting arm means.

19. The device of claim 18, wherein each of said pair of lift columns are rigid for compression during movement of said lifting arm means from said platform to a point at approximately a vertical orientation of said lifting arm means and are further adapted to extend in length telescopically past said point of vertical orientation.

20. The device of claim 11, wherein said hydraulic fluid source means includes separate and independent bi-directional hydraulic fluid flow means for movement of said hydraulic double-acting cylinder means in said channels, said hydraulic lift cylinder means on said lifting arms, and said hydraulic motor means on said reel engaging positions on said lifting arm means.

* * * * *